US012461477B2

(12) United States Patent
Inaba et al.

(10) Patent No.: US 12,461,477 B2
(45) Date of Patent: Nov. 4, 2025

(54) BINDING APPARATUS, IMAGE FORMING SYSTEM, NON-TRANSITORY COMPUTER READABLE MEDIUM STORING A PROGRAM, AND METHOD

(71) Applicant: FUJIFILM BUSINESS INNOVATION CORP., Tokyo (JP)

(72) Inventors: Nobuhide Inaba, Kanagawa (JP); Kumiko Tanaka, Kanagawa (JP); Takashi Ogino, Kanagawa (JP); Masashi Matsumoto, Kanagawa (JP); Takumi Uegane, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 379 days.

(21) Appl. No.: 17/950,470

(22) Filed: Sep. 22, 2022

(65) Prior Publication Data

US 2023/0305474 A1 Sep. 28, 2023

(30) Foreign Application Priority Data

Mar. 25, 2022 (JP) ................................ 2022-050650

(51) Int. Cl.
*B65H 37/04* (2006.01)
*G03G 15/00* (2006.01)

(52) U.S. Cl.
CPC ......... *G03G 15/6544* (2013.01); *B65H 37/04* (2013.01); *B65H 2301/5142* (2013.01); *B65H 2301/51616* (2013.01); *B65H 2801/27* (2013.01)

(58) Field of Classification Search
CPC .......... B65H 37/04; B65H 2301/51616; B65H 2301/5162; B65H 2301/43828; G03G 2215/00852; G03G 15/6544; B31F 1/00; B31F 1/07; B31F 5/02; B31F 2201/0707; B31F 2201/0754; B31F 2201/0771; B31F 2201/0784
USPC .......................................... 270/58.07, 58.08
See application file for complete search history.

(56) References Cited

U.S. PATENT DOCUMENTS

| | | | | |
|---|---|---|---|---|
| 9,399,841 | B2 * | 7/2016 | Yamada | B31D 1/0075 |
| 10,603,945 | B2 * | 3/2020 | Matsumoto | B42B 4/00 |
| 10,632,706 | B2 * | 4/2020 | Makita | B65H 37/04 |
| 10,654,240 | B2 * | 5/2020 | Takahashi | B65H 37/04 |
| 11,014,325 | B2 * | 5/2021 | Takahashi | B65H 31/3081 |
| 11,383,951 | B2 * | 7/2022 | Kawakami | B41J 11/58 |
| 2022/0334525 | A1 * | 10/2022 | Sasaki | G03G 15/6544 |

FOREIGN PATENT DOCUMENTS

JP 6171514 B2 8/2017

* cited by examiner

*Primary Examiner* — Leslie A Nicholson, III
(74) *Attorney, Agent, or Firm* — Oliff PLC

(57) ABSTRACT

A binding apparatus includes a binder configured to bind sheets of paper by advancing binding teeth toward the sheets of paper, a water supplier configured to supply a preset amount of water to the sheets of paper to be bound by the binder, and a processor configured to, if a specific condition is satisfied, make a setting to reduce the amount of water to be supplied to the sheets of paper by the water supplier.

19 Claims, 12 Drawing Sheets

FIG. 9A

| ESTIMATED BOUND PAPER COUNT | ORIGINAL SUPPLY AMOUNT (TOTAL AMOUNT) |
|---|---|
| 2-5 | 10 μl |
| 5-10 | 20 μl |
| 10-20 | 25 μl |
| 20- | 30 μl |

FIG. 9B

| ESTIMATED BOUND PAPER COUNT | OFF | -10% | -20% |
|---|---|---|---|
| 2-5 | 10 μl | 9 μl | 8 μl |
| 5-10 | 20 μl | 18 μl | 16 μl |
| 10-20 | 25 μl | 23 μl | 20 μl |
| 20- | 30 μl | 27 μl | 24 μl |

9A 9B 9C

FIG. 10

| ESTIMATED BOUND PAPER COUNT | ORIGINAL SUPPLY AMOUNT |
|---|---|
| 2–5 | 10 μl |
| 5–10 | 20 μl |
| 10–20 | 25 μl |
| 20– | 30 μl |

×

| BINDING FORCE | COEFFICIENT |
|---|---|
| OFF | 100% |
| SLIGHTLY SMALL (10A) | 90% |
| SMALL (10B) | 80% |

×

| BINDING PERIOD | COEFFICIENT |
|---|---|
| OFF | 100% |
| SLIGHTLY LONG (10C) | 90% |
| LONG (10D) | 80% |

FIG. 11

| ESTIMATED BOUND PAPER COUNT | ORIGINAL SUPPLY AMOUNT |
|---|---|
| 2–5 | 10 μl |
| 5–10 | 20 μl |
| 10–20 | 25 μl |
| 20– | 30 μl |

×

ENVIRONMENT INFORMATION

| HUMIDITY | COEFFICIENT |
|---|---|
| OFF | 100% |
| HIGH (11A) | 90% |
| VERY HIGH (11B) | 80% |

×

PAPER TYPE INFORMATION

| PAPER TYPE | COEFFICIENT |
|---|---|
| OFF OR UNKNOWN (11E) | 100% |
| PLAIN PAPER (11C) | 90% |
| RECYCLED PAPER (11D) | 80% |

×

BINDING METHOD

| BINDING METHOD | COEFFICIENT |
|---|---|
| PARALLEL BINDING (11F) | 100% |
| OBLIQUE BINDING (11G) | 90% |

BINDING APPARATUS, IMAGE FORMING SYSTEM, NON-TRANSITORY COMPUTER READABLE MEDIUM STORING A PROGRAM, AND METHOD

CROSS-REFERENCE TO RELATED APPLICATIONS

This application is based on and claims priority under 35 USC 119 from Japanese Patent Application No. 2022-050650 filed Mar. 25, 2022.

BACKGROUND

(i) Technical Field

The present disclosure relates to a binding apparatus, an image forming system, a non-transitory computer readable medium storing a program, and a method.

(ii) Related Art

Japanese Patent No. 6171514 discloses a paper post-processing apparatus including a binder that positions a plurality of stacked sheets of paper of a paper bundle to be bound by corrugating a part of the paper bundle under pressure.

SUMMARY

Aspects of non-limiting embodiments of the present disclosure relate to the following circumstances. Paper binding strength may be increased by binding sheets of paper supplied with water.

For example, water in a container is supplied to sheets of paper. As the consumption of water is reduced, the water replenishment count for the container and the size of the container may be reduced. Also in a case where water is supplied to sheets of paper without using a container, the amount of use of water may be reduced as the consumption of water for binding is reduced.

Aspects of non-limiting embodiments of the present disclosure therefore relate to reduction in the amount of water for paper binding compared with a structure in which the amount of water to be supplied to sheets of paper is not reduced.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a binding apparatus comprising: a binder configured to bind sheets of paper by advancing binding teeth toward the sheets of paper; a water supplier configured to supply a preset amount of water to the sheets of paper to be bound by the binder; and a processor configured to, if a specific condition is satisfied, make a setting to reduce the amount of water to be supplied to the sheets of paper by the water supplier.

BRIEF DESCRIPTION OF THE DRAWINGS

An exemplary embodiment of the present disclosure will be described in detail based on the following figures, wherein:

FIGS. 9A and 9B illustrate specific examples of water saving in a manual water saving mode;

FIG. 10 illustrates another specific example of the water saving;

FIG. 11 illustrates another specific example of water saving in an automatic water saving mode;

DETAILED DESCRIPTION

An exemplary embodiment of the present disclosure is described in detail with reference to the accompanying drawings.

Figure 1:
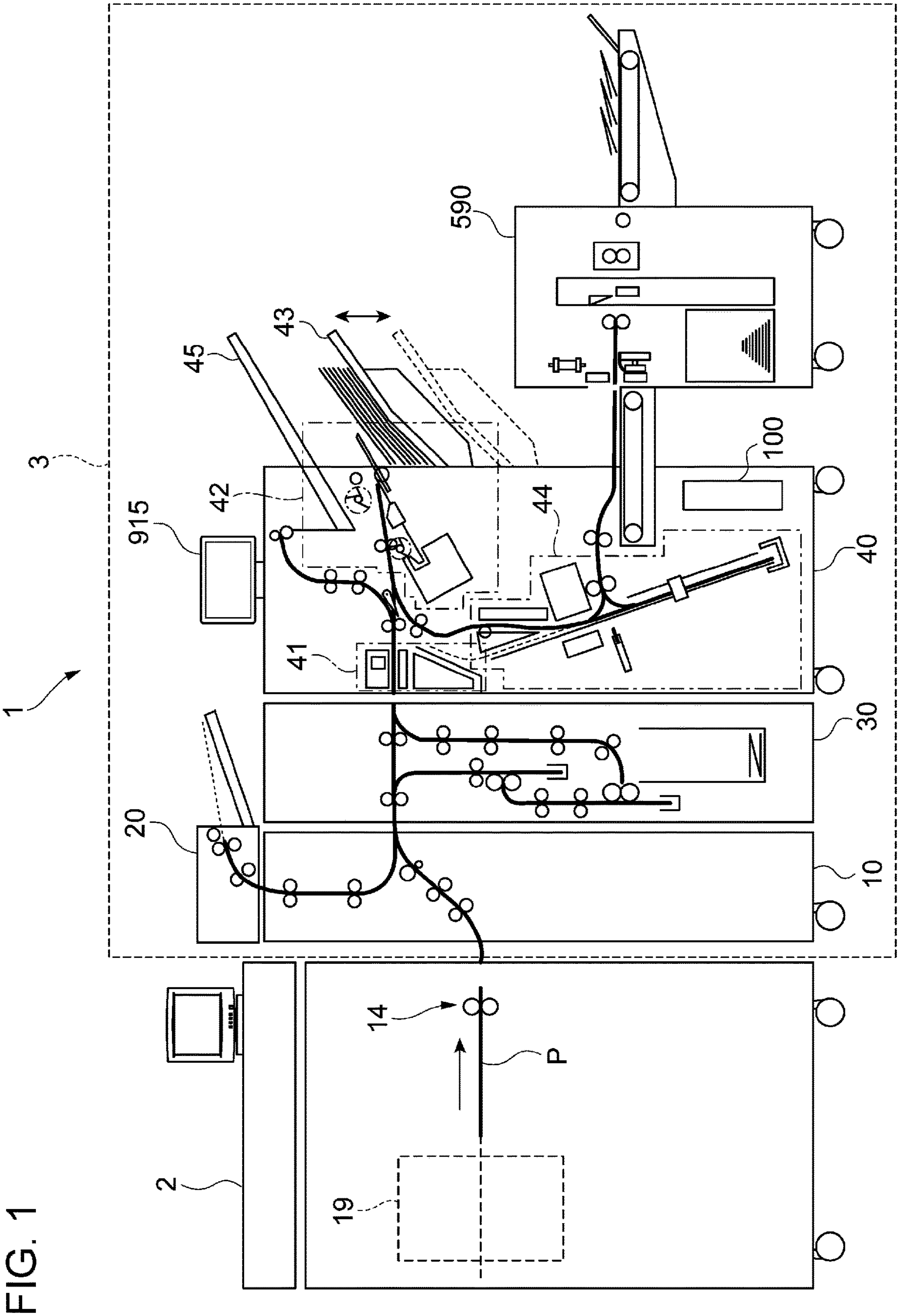
FIG. 1 illustrates the overall structure of an image forming system.

FIG. 1 illustrates the overall structure of an image forming system 1.

In FIG. 1, the image forming system 1 includes an image forming apparatus 2 that forms an image on paper P that is an example of a recording medium, and a paper processing apparatus 3 that performs a predetermined process on the paper P having the image formed by the image forming apparatus 2.

The image forming apparatus 2 includes an image forming unit 19 that forms an image on the paper P by an electrophotographic or inkjet system.

The image forming apparatus 2 includes a fixing device 14. The fixing device 14 is disposed on a downstream side of the image forming unit 19 in a transport direction of the paper P.

The fixing device 14 pressurizes and heats the paper P with an image. Thus, the image on the paper P is fixed onto the paper P.

The paper processing apparatus 3 that is an example of a processing apparatus includes a transport device 10 that transports the paper P downstream from the image forming apparatus 2, and an inserting paper feeding device 20 that feeds inserting paper such as thick or window paper P to the paper P transported by the transport device 10.

The paper processing apparatus 3 includes a folding device 30 that performs a folding process such as inward triple folding (C-folding) or outward triple folding (Z-folding) on the paper P transported from the transport device 10.

The paper processing apparatus 3 includes a first post-processing device 40 that is provided on a downstream side of the folding device 30 and performs, for example, punching, edge binding, or saddle stitching on the paper P.

On the downstream side of the folding device 30, the first post-processing device 40 performs a process on a paper bundle including a plurality of sheets of paper P having images formed by the image forming apparatus 2, or a process on each sheet of paper P.

The paper processing apparatus 3 includes a second post-processing device 590 that is provided on a downstream side of the first post-processing device 40 and processes a paper bundle that has undergone central folding or saddle stitching.

The paper processing apparatus 3 includes an information processor 100. The information processor 100 includes a central processing unit (CPU) that executes programs, and controls the entire paper processing apparatus 3.

The paper processing apparatus 3 includes an information display 915 that displays information for users. The information display 915 is a so-called touch panel and receives users' operations. In other words, the information display 915 of this exemplary embodiment receives information input by users.

The first post-processing device 40 includes a punching unit 41 that punches paper P, and an edge binder 42 that binds the edge of a paper bundle.

Paper P having passed through the edge binder 42 is stacked on a first stacker 43. Paper P that is not processed or is only punched in the first post-processing device 40 is stacked on a second stacker 45.

The first post-processing device 40 includes a saddle stitching unit 44 that produces a double-page book by central folding or saddle stitching of a paper bundle.

Figure 2:
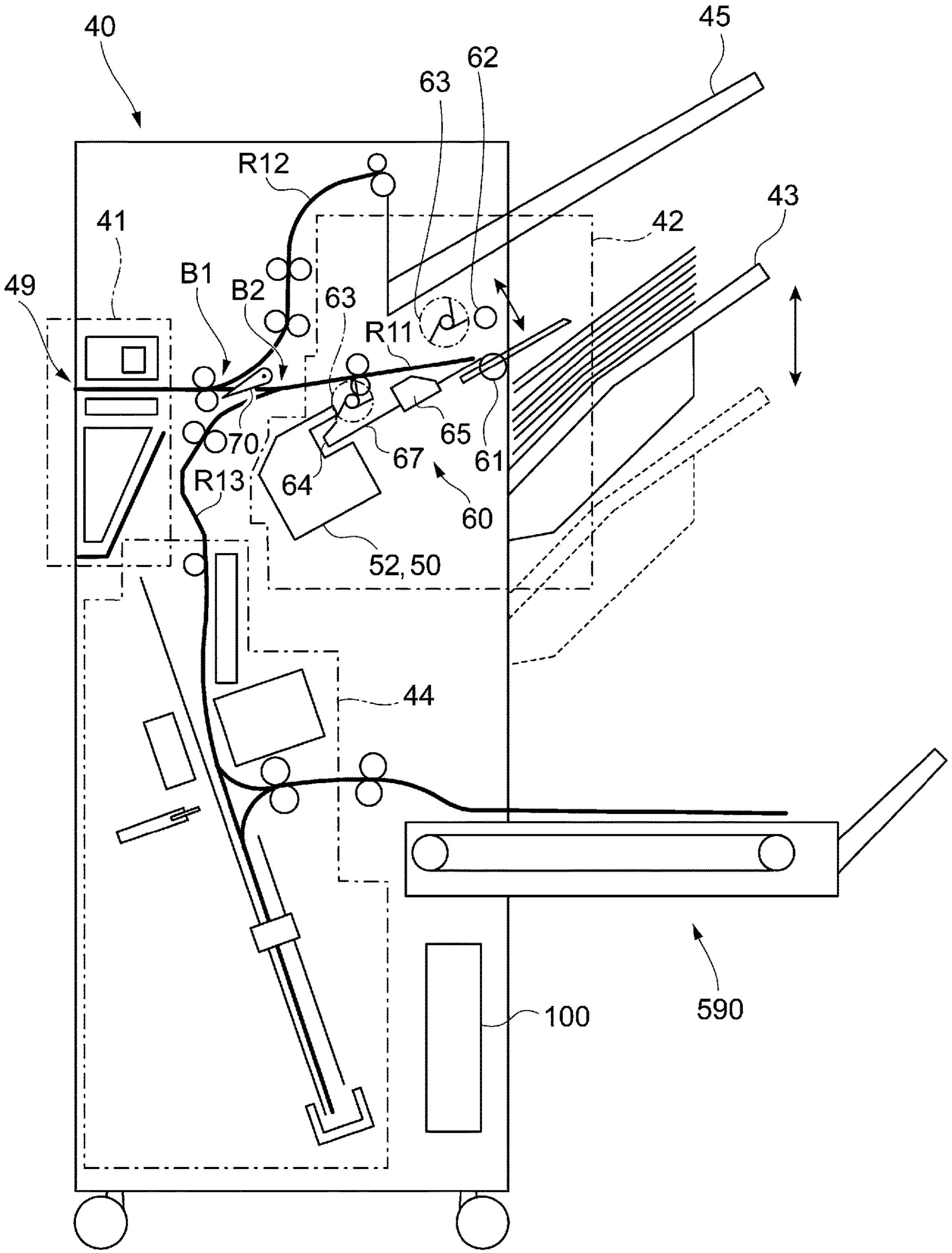
FIG. 2 illustrates the structure of a first post-processing device.

FIG. 2 illustrates the structure of the first post-processing device 40.

The first post-processing device 40 has an inlet 49 that receives paper P transported from the folding device 30.

The punching unit 41 is provided on an immediately downstream side of the inlet 49. The punching unit 41 punches two or four holes in the paper P transported to the first post-processing device 40.

A first paper transport path R11 is provided from the inlet 49 to the edge binder 42, and is used to transport the paper P received through the inlet 49 to the edge binder 42.

At a first branch portion B1, a second paper transport path R12 branches from the first paper transport path R11, and is used to transport the paper P to the second stacker 45.

At a second branch portion B2, a third paper transport path R13 branches from the first paper transport path R11, and is used to transport the paper P to the saddle stitching unit 44.

A switching gate 70 switches the transport destination of the paper P to any one of the first paper transport path R11 to the third paper transport path R13.

The edge binder 42 includes a paper collector 60 that produces a paper bundle by collecting a predetermined number of sheets of paper P.

The paper collector 60 includes a support plate 67 that is inclined from the horizontal direction and supports the transported paper P from the bottom. In this exemplary embodiment, the paper bundle is produced on the support plate 67.

The edge binder 42 includes a binding unit 50 that binds the edge of the produced paper bundle (edge binding).

The binding unit 50 of this exemplary embodiment is a binding unit 52 that binds the paper bundle without using staples.

The edge binder 42 includes a transport roller 61 that rotates to send the produced paper bundle to the first stacker 43. The edge binder 42 includes a movable roller 62 movable between a position where the movable roller 62 is retracted from the transport roller 61 and a position where the movable roller 62 is in press contact with the transport roller 61.

To perform the process in the edge binder 42, transported paper P is first received through the inlet 49.

Then, the paper P is transported along the first paper transport path R11 and reaches the edge binder 42.

The paper P transported to a point above the support plate 67 drops onto the support plate 67. The paper P is supported by the support plate 67 from the bottom and slides along the support plate 67 by the inclination of the support plate 67 and by a rotary member 63.

Then, the paper P abuts against an end guide 64 attached to the end of the support plate 67. In this exemplary embodiment, the end guide 64 extends upward from the end of the support plate 67 in the figure, and the paper P moving along the support plate 67 abuts against the end guide 64.

In this exemplary embodiment, the movement of the paper P is stopped in this manner. This operation is performed every time paper P is transported from the upstream side, and a paper bundle including a plurality of sheets of paper P stacked in alignment is produced on the support plate 67.

In this exemplary embodiment, paper widthwise position aligning members 65 align the position of the paper bundle in its width direction.

In this exemplary embodiment, every time paper P is fed onto the support plate 67, the edges (sides) of the paper P in its width direction are pushed by the paper widthwise position aligning member 65 and the position of the paper P (paper bundle) in the width direction is aligned.

When a predetermined number of sheets of paper P are stacked on the support plate 67, the binding unit 52 that is an example of a binder binds the edge of the paper bundle.

The binding unit 52 binds the paper bundle by pinching the paper bundle with two binding teeth to crimp the sheets of paper P constituting the paper bundle.

In this exemplary embodiment, the movable roller 62 advances toward the transport roller 61, and the paper bundle is nipped by the movable roller 62 and the transport roller 61. Then, the transport roller 61 rotates to transport the paper bundle to the first stacker 43.

In this exemplary embodiment, the binding unit 52 is movable toward a far side or a near side of the drawing sheet of FIG. 2 to bind the sheets of paper P at a plurality of points.

To perform edge binding of the sheets of paper P in this exemplary embodiment, the sheets of paper P having images formed by the image forming apparatus 2 are transported to the edge binder 42 in the first post-processing device 40. The edge binder 42 binds the transported sheets of paper P.

In this exemplary embodiment, the first post-processing device 40 may be regarded as a binding apparatus that binds sheets of paper.

Figure 3:
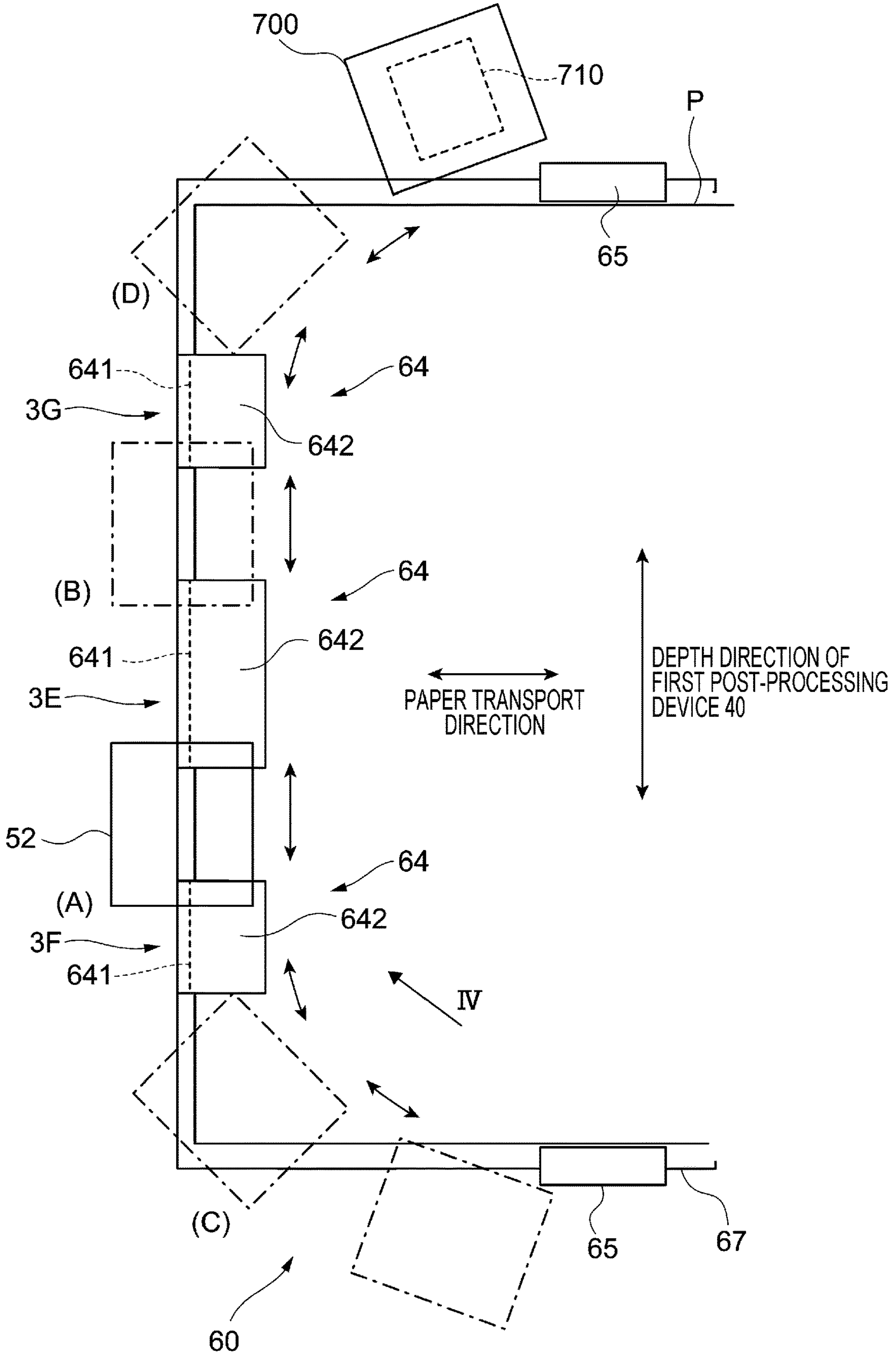
FIG. 3 is a top view of a paper collector.

FIG. 3 is a top view of the paper collector 60.

In this exemplary embodiment, the binding unit 52 is provided as described above.

In this exemplary embodiment, a water adjusting mechanism 700 adjusts water contained in the sheets of paper P collected by the paper collector 60.

In this exemplary embodiment, the water adjusting mechanism 700 adjusts water as appropriate every time paper P is transported to the edge binder 42. In other words, the water adjusting mechanism 700 adjusts water as appropriate for each sheet of paper in this exemplary embodiment.

The water adjusting mechanism 700 may adjust water after a paper bundle is produced.

The water adjusting mechanism 700 includes a water supplier 710. Although illustration is omitted, a detachable container stores water to be supplied to the water supplier 710 in this exemplary embodiment. The container may be provided in the water adjusting mechanism 700 or at a position different from the water adjusting mechanism 700.

In the case where the container is provided at a position different from the water adjusting mechanism 700, water is supplied from the container to the water adjusting mechanism 700 through a tube (not illustrated).

The water supplier 710 supplies a preset amount of water to the sheets of paper P to be bound by the binding unit 52.

For example, the water supplier 710 includes an impregnator that is impregnated with water and advances to or retreats from paper P. The impregnator comes into contact with the paper P to supply water to the paper P.

More specifically, the impregnator of the water supplier 710 comes into contact with a binding portion on the paper P to supply water to the binding portion.

For example, the water supplier 710 supplies water to the paper P by ejecting water to the paper P from a nozzle or a head. For example, the water supplier 710 supplies water to the paper P by dripping a water droplet from above the paper P.

The water supplied to the paper P is not limited to pure water and may contain any other component.

In this exemplary embodiment, the water supplier 710 is movable but may be stationary.

In the case where the water supplier 710 is stationary, the water supplier 710 is provided, for example, at each binding position on the paper P.

The binding portion may be supplied with water in the image forming apparatus 2 instead of in the edge binder 42 (see FIG. 1).

Alternatively, the binding portion may be supplied with water, for example, in the process of transporting the paper P from the image forming apparatus 2 to the edge binder 42.

In other words, the binding portion may be supplied with water on the transport path of the paper P toward the edge binder 42.

The binding unit 52 and the water adjusting mechanism 700 are disposed at different positions in a depth direction of the first post-processing device 40.

In this exemplary embodiment, the binding unit 52 and the water adjusting mechanism 700 move along the depth direction of the first post-processing device 40 orthogonal to the transport direction of the paper P (paper bundle).

In this exemplary embodiment, the binding unit 52 and the water adjusting mechanism 700 move along one common path.

In this exemplary embodiment, the binding unit 52 is movable to bind a plurality of points on the paper bundle.

In this exemplary embodiment, the water adjusting mechanism 700 is movable to supply water at a plurality of points on the paper bundle. The water adjusting mechanism 700 may supply water to each sheet of paper or after a paper bundle is produced.

For example, the binding unit 52 stops at two different points (point (A) and point (B) in FIG. 3) in the depth direction of the first post-processing device 40 and binds the paper bundle at the two points (two-point edge binding).

The binding unit 52 stops at one end of the paper bundle (one corner of the paper bundle) (point (D) in FIG. 3) and binds the paper bundle at this stop position (one-point edge binding).

The binding unit 52 stops at another end of the paper bundle (another corner of the paper bundle) (point (C) in FIG. 3) and binds the paper bundle at this stop position (one-point edge binding).

The water adjusting mechanism 700 also stops at the two points described above (point (A) and point (B) in FIG. 3) and supplies water at the two points.

The water adjusting mechanism 700 stops at one end of the paper bundle (one corner of the paper bundle) (point (D) in FIG. 3) and supplies water at this stop position.

The water adjusting mechanism 700 stops at another end of the paper bundle (another corner of the paper bundle) (point (C) in FIG. 3) and supplies water at this stop position.

In this exemplary embodiment, each of the binding unit 52 and the water adjusting mechanism 700 linearly moves between the points (A) and (B).

In this exemplary embodiment, each of the binding unit 52 and the water adjusting mechanism 700 moves along with rotation at, for example, 45° between the points (A) and (C) or between the points (B) and (D).

To move each of the binding unit 52 and the water adjusting mechanism 700, a drive source such as a motor is provided thereto. In this case, each of the binding unit 52 and the water adjusting mechanism 700 moves alone.

To move each of the binding unit 52 and the water adjusting mechanism 700, the binding unit 52 and the water adjusting mechanism 700 are attached to, for example, a movable belt. Then, the belt is moved. Thus, the binding unit 52 and the water adjusting mechanism 700 are moved.

In this exemplary embodiment, a plurality of end guides 64 are provided as illustrated in FIG. 3.

The end guides 64 are disposed at different positions in the depth direction of the first post-processing device 40 (direction orthogonal to the transport direction of the paper P).

As illustrated in FIG. 3, each end guide 64 includes a regulator 641 and a facing piece 642.

The regulator 641 is orthogonal to the support plate 67. In this exemplary embodiment, the end of paper P abuts against the regulator 641 to regulate movement of the paper P.

The facing piece 642 is connected to the regulator 641 and faces the support plate 67.

In this exemplary embodiment, when paper P is placed on the support plate 67, the end of the paper P enters a space between the facing piece 642 and the support plate 67. The end of the paper P abuts against the regulator 641. Thus, the paper P is aligned.

A paper bundle is bound at the point (A) in FIG. 3 through a space between the facing piece 642 (3E) at the center in FIG. 3 (center in a vertical direction) and the facing piece 642 (3F) on a lower side in FIG. 3.

Water is supplied at the point (A) in FIG. 3 also through the space between the facing piece 642 (3E) at the center in FIG. 3 and the facing piece 642 (3F) on the lower side in FIG. 3.

A paper bundle is bound at the point (B) in FIG. 3 through a space between the facing piece 642 (3G) on an upper side in FIG. 3 and the facing piece 642 (3E) at the center in FIG. 3.

Water is supplied at the point (B) in FIG. 3 also through the space between the facing piece 642 (3G) on the upper side in FIG. 3 and the facing piece 642 (3E) at the center in FIG. 3.

In this exemplary embodiment, the binding unit 52 does not use a binding member such as staples, but a binding unit 52 using the binding member may be added.

In the case where the binding unit 52 using the binding member is added, the binding unit 52 to be used for binding is switched, for example, in response to an instruction from a user.

In this case, both the binding without the binding member and the binding with the binding member may be performed.

Figure 4:
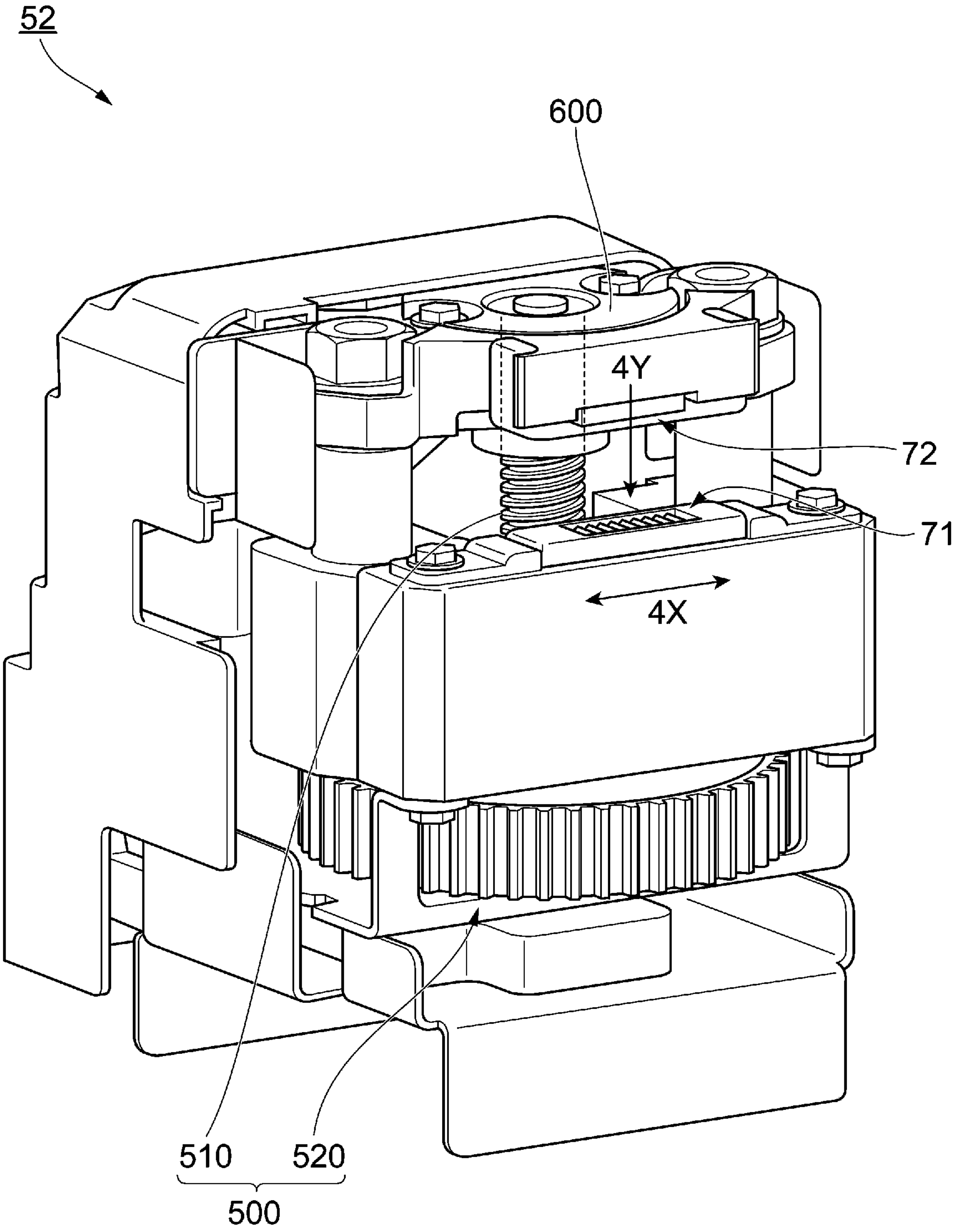
FIG. 4 illustrates a binding unit viewed in an arrow IV direction in FIG. 3.

FIG. 4 illustrates the binding unit 52 viewed in an arrow IV direction in FIG. 3.

The binding unit 52 that is an example of the binder includes first binding teeth 71 to be used to bind a paper bundle including a plurality of sheets of paper P.

Second binding teeth 72 are provided above the first binding teeth 71.

The first binding teeth 71 and the second binding teeth 72 have projections and depressions.

The projections and the depressions are alternately arranged in an arrow 4X direction in the figure on a surface of the first binding teeth 71 facing the second binding teeth 72 and on a surface of the second binding teeth 72 facing the first binding teeth 71.

In other words, the projections and the depressions are alternately arranged in a longitudinal direction of the first binding teeth 71 and the second binding teeth 72 on the surface of the first binding teeth 71 facing the second binding teeth 72 and on the surface of the second binding teeth 72 facing the first binding teeth 71.

To bind a paper bundle by the first binding teeth 71 and the second binding teeth 72, the second binding teeth 72 advance toward the first binding teeth 71.

To bind a paper bundle in this exemplary embodiment, the second binding teeth 72 descend toward the first binding teeth 71 along a linear path indicated by an arrow 4Y in the figure.

In this exemplary embodiment, a paper bundle (not illustrated) between the first binding teeth 71 and the second binding teeth 72 is pinched and pressed by the first binding teeth 71 and the second binding teeth 72.

In this exemplary embodiment, the projections of the first binding teeth 71 and the depressions of the second binding teeth 72 face each other. Further, the depressions of the first binding teeth 71 and the projections of the second binding teeth 72 face each other.

The projections of the binding teeth on one side enter the depressions of the binding teeth on the other side.

Thus, sheets of paper P constituting the paper bundle are bound by crimping. In this exemplary embodiment, the second binding teeth 72 then retreat upward from the first binding teeth 71.

In this exemplary embodiment, the projections and the depressions of the first binding teeth 71 and the second binding teeth 72 are alternately arranged, but may be arranged in other fashions.

The binding unit 52 includes a movement mechanism 500 that is an example of a mover configured to move the second binding teeth 72 toward the first binding teeth 71.

The movement mechanism 500 includes a rod-shaped screw member 510 extending along a vertical direction in the figure. The screw member 510 rotates in its circumferential direction to move the second binding teeth 72 toward the first binding teeth 71.

In this exemplary embodiment, an interlock portion 600 moves in conjunction with the second binding teeth 72. In this exemplary embodiment, the screw member 510 meshes with the interlock portion 600. In other words, the screw member 510 is connected to the interlock portion 600.

The movement mechanism 500 moves the second binding teeth 72 toward the first binding teeth 71 by rotating the screw member 510 meshing with the interlock portion 600 in the circumferential direction.

In this exemplary embodiment, the screw member 510 rotates in one circumferential direction in response to forward rotation of a drive motor (not illustrated) provided in the binding unit 52.

Therefore, the interlock portion 600 and the second binding teeth 72 descend and the second binding teeth 72 move toward the first binding teeth 71 to bind a paper bundle.

After the finish of binding, the screw member 510 rotates in a reverse direction in response to reverse rotation of the drive motor.

Therefore, the interlock portion 600 and the second binding teeth 72 ascend. The ascending second binding teeth 72 retreat from the first binding teeth 71.

In this exemplary embodiment, the second binding teeth 72 are moved by using the screw member 510, but the mechanism for moving the second binding teeth 72 is not particularly limited, and a cam mechanism or a jack mechanism may be used instead.

In this exemplary embodiment, the second binding teeth 72 are moved, but the first binding teeth 71 may be moved or both the first binding teeth 71 and the second binding teeth 72 may be moved.

In this exemplary embodiment, the binding unit 52 is configured to pass the end guide 64 in FIG. 3.

In this exemplary embodiment, the maximum separation distance between the first binding teeth 71 and the second binding teeth 72 is larger than the height dimension of the end guide 64. The binding unit 52 passes the end guide 64 through a space between the first binding teeth 71 and the second binding teeth 72.

Figure 5:
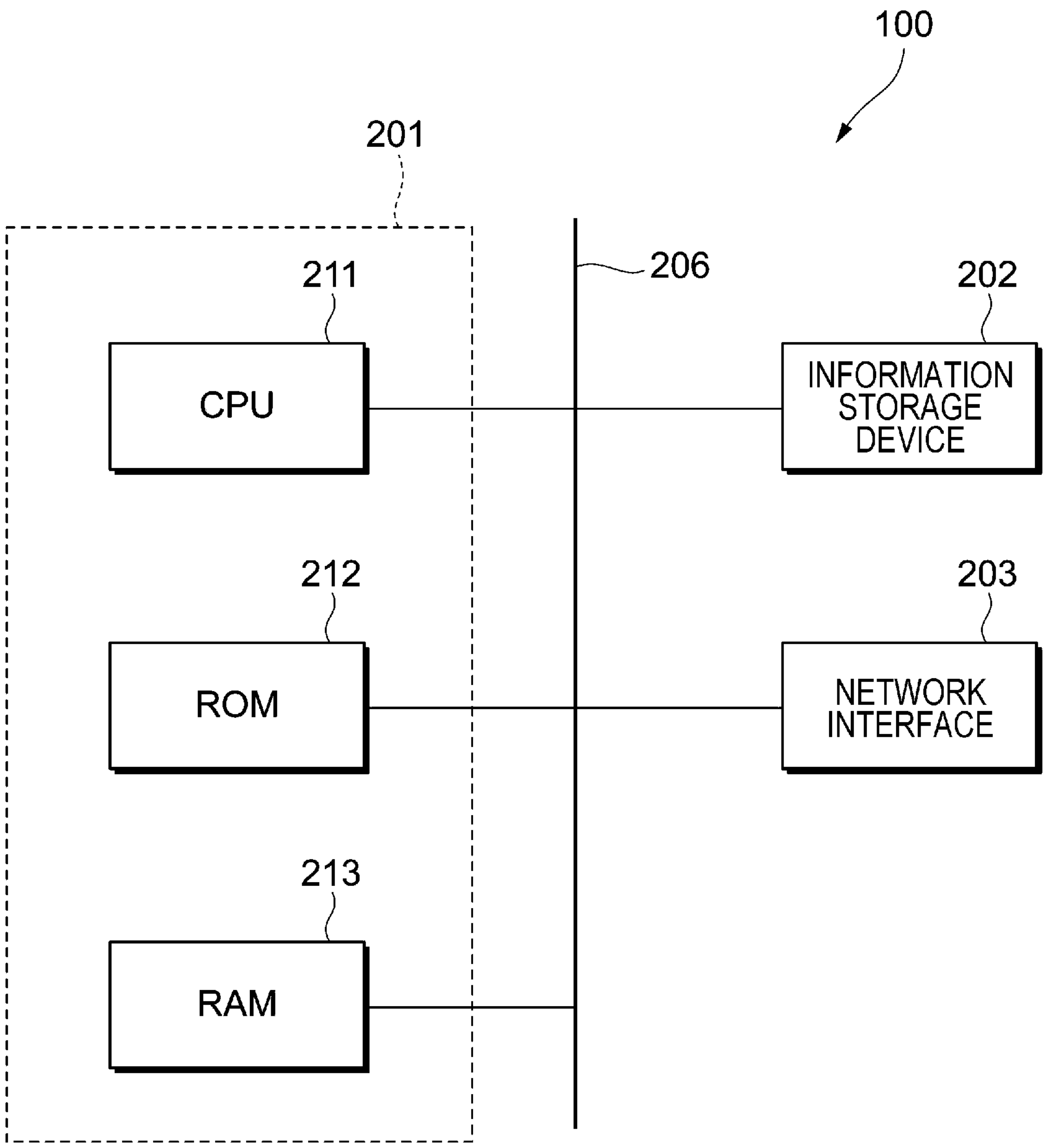
FIG. 5 illustrates the hardware configuration of an information processor.

FIG. 5 illustrates the hardware configuration of the information processor 100.

The information processor 100 includes a processing unit 201, an information storage device 202 that stores information, and a network interface 203 that performs communication via a local area network (LAN) cable or the like.

The processing unit 201 is a computer.

The processing unit 201 includes a central processing unit (CPU) 211 that is an example of a processor configured to execute various processes described later. The processing unit 201 includes a read only memory (ROM) 212 that stores software, and a random access memory (RAM) 213 to be used as a working area.

The information storage device 202 is implemented by existing devices such as a hard disk drive, a semiconductor memory, or a magnetic tape.

The processing unit 201, the information storage device 202, and the network interface 203 are connected through a bus 206 or signal lines (not illustrated).

Programs to be executed by the CPU 211 may be provided to the information processor 100 by being stored in a computer readable recording medium such as a magnetic recording medium (e.g., a magnetic tape or a magnetic disk), an optical recording medium (e.g., an optical disc), a magneto-optical recording medium, or a semiconductor memory. The programs may be provided to the information processor 100 by using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Specific Examples of Processes

The processes to be executed by the information processor 100 are described.

As described above, the water supplier 710 of this exemplary embodiment supplies water to sheets of paper P to be bound.

In this exemplary embodiment, the amount of water supplied to the sheets of paper P is reduced as appropriate. In this exemplary embodiment, the CPU 211 that is an example of the processor sets the water supplier 710 to reduce the amount of water supplied to the sheets of paper P if a specific condition is satisfied.

In this exemplary embodiment, the water supplier 710 supplies water to the sheets of paper P to be bound in an amount that is based on the sheets of paper P. In this exemplary embodiment, the amount of water is set based on the sheets of paper P to be bound, and the set amount of water is supplied to the sheets of paper P.

For example, the water supplier 710 supplies water to the sheets of paper P to be bound in an amount that is based on the number of the sheets of paper P. The water supplier 710 supplies water to the sheets of paper P to be bound to increase the total amount of water to be supplied in response to an increase in the number of the sheets of paper P.

In other words, the water supplier 710 supplies water to increase the amount of water to be supplied per paper bundle to be produced by binding in response to an increase in the number of sheets of paper P constituting the paper bundle.

If the specific condition is satisfied, the CPU 211 causes water to be supplied to the sheets of paper P in an amount smaller than the amount of water set based on the sheets of paper P.

For example, in response to an instruction from a user, the CPU 211 causes water to be supplied to the sheets of paper P in an amount smaller than the amount of water set based on the sheets of paper P.

In other words, the CPU 211 makes a setting to reduce the amount of water to be supplied to the sheets of paper P in response to the instruction from the user.

More specifically, the CPU 211 makes the setting to reduce the amount of water in response to a user's operation on the information display 915 (see FIG. 1) for an instruction to set a water saving mode as a mode related to water supply.

As described later, the CPU 211 makes the setting to reduce the amount of water, for example, if the user makes a specific setting other than the setting of the water saving mode or if the state determined based on environment information or the like is a specific state.

Examples of the specific setting other than the setting of the water saving mode include a setting about binding. Examples of the setting about binding include a setting to reduce a binding force and a setting to increase a binding period.

The CPU 211 makes the setting to reduce the amount of water if the user makes the setting to reduce the binding force.

If the setting is made to reduce the amount of water, the adhesion strength of fibers of sheets of paper P and the binding force tend to decrease.

The CPU 211 makes the setting to reduce the amount of water if the user makes the setting to increase the binding period.

In this exemplary embodiment, the user may set the binding period by operating the information display 915.

More specifically, if the user makes the setting to increase the binding period, the first binding teeth 71 and the second binding teeth 72 pinch the binding portion of the sheets of paper P for a longer period to increase the binding strength.

In this exemplary embodiment, the setting is made to reduce the amount of water based on other settings on the binding, information on water contained in the sheets of paper P, environment information, or information on the type of the sheets of paper P as described later.

In this exemplary embodiment, the CPU 211 sets a water reduction amount if the setting is made to reduce the amount of water.

The CPU 211 sets the water reduction amount based on, for example, the setting on the binding.

For example, the CPU 211 makes the setting to reduce the amount of water if the setting on the binding is a setting to increase the advancing amount of the second binding teeth 72 over a predetermined threshold.

To make this setting to reduce the amount of water, the CPU 211 sets the water reduction amount to become larger than in a setting to reduce the advancing amount under the predetermined threshold.

In this exemplary embodiment, the sheets of paper P are compressed more as the advancing amount of the second binding teeth 72 increases. Therefore, the binding strength tends to increase.

For example, the CPU 211 determines whether to reduce the amount of water based on information on water contained in the sheets of paper P to be bound.

If determination is made to reduce the amount of water, the CPU 211 sets the water reduction amount based on the information on the water contained in the sheets of paper P to be bound.

More specifically, if the amount of water indicated by the information on the water contained in the sheets of paper P to be bound (hereinafter referred to as "specific water") is larger than a predetermined threshold, the CPU 211 makes the setting to reduce the amount of water and sets the water reduction amount to become larger than in a case where the amount of the specific water is smaller than the threshold.

If the amount of the specific water is smaller than the predetermined threshold, the CPU 211 sets the water reduction amount to become smaller than in the case where the amount of the specific water is larger than the predetermined threshold.

The description "the water reduction amount becomes smaller" herein includes a case where the water reduction amount is zero.

The information on the water contained in the sheets of paper P to be bound is acquired based on information input from a sensor or input by the user.

For example, the information on the water contained in the sheets of paper P is acquired based on information from a sensor that directly detects water contained in the sheets of paper P or a sensor that acquires environment information such as humidity, or information on the type of the sheets of paper P that is input by the user via the information display 915.

The amount of water contained in paper P may change depending on humidity or whether the paper P is recycled paper or plain paper. Information on the water contained in the paper P may be acquired based on information from the sensor that acquires environment information or information on the type of the paper P.

In other words, the information on the water contained in the paper P may be acquired based not only on information from the sensor that directly detects water contained in the paper P but also on information from the sensor that acquires environment information or information on the type of the paper P.

For example, the CPU 211 determines whether to reduce the amount of water based on environment information on the inside and/or the outside of the first post-processing device 40 (see FIG. 1) that is an example of the binding apparatus.

If a setting is made to reduce the amount of water, the CPU 211 sets the water reduction amount based on, for example, the environment information.

For example, the CPU 211 increases the water reduction amount if the environment information indicates a high humidity.

More specifically, if the humidity indicated by the environment information is higher than a predetermined threshold, the CPU 211 sets the water reduction amount to become larger than in a case where the humidity is lower than the predetermined threshold.

For example, the CPU 211 reduces the water reduction amount if the environment information indicates a low humidity.

More specifically, if the humidity indicated by the environment information is lower than the predetermined threshold, the CPU 211 sets the water reduction amount to become smaller than in the case where the humidity is higher than the predetermined threshold.

The environment information to be used to set the water reduction amount may be either one or both of internal environment information on the inside of the first post-processing device 40 and external environment information on the outside of the first post-processing device 40.

In a case where both the internal environment information and the external environment information are used, the water reduction amount may be increased, for example, if both the humidity indicated by the internal environment information and the humidity indicated by the external environment information are higher than the predetermined threshold.

Alternatively, the water reduction amount may be increased, for example, if the humidity indicated by the internal environment information or the humidity indicated by the external environment information is higher than the predetermined threshold.

For example, the CPU 211 determines whether to reduce the amount of water based on information on the type of the sheets of paper P to be bound (hereinafter referred to as "paper type information").

If a setting is made to reduce the amount of water, the CPU 211 sets the water reduction amount based on, for example, the paper type information.

For example, if the type of the sheets of paper P indicated by the paper type information is plain paper, the CPU 211 sets the water reduction amount to become larger than in a case where the type of the sheets of paper P is unknown.

Plain paper is likely to contain water. In this case, the amount of water to be supplied to the sheets of paper P may be reduced.

If the type of the sheets of paper P is plain paper, the CPU 211 makes the setting to reduce the amount of water and sets the water reduction amount to become larger than in the case where the type of the sheets of paper P is unknown.

For example, if the type of the sheets of paper P indicated by the paper type information is recycled paper, the CPU 211 makes the setting to reduce the amount of water.

In this case, the CPU 211 sets the water reduction amount to become larger than in the case where the type of the sheets of paper P is plain paper.

For example, the CPU 211 determines whether to reduce the amount of water based on a binding method of the binding unit 52.

If a setting is made to reduce the amount of water, the CPU 211 sets the water reduction amount based on, for example, the binding method of the binding unit 52.

Figure 6A:
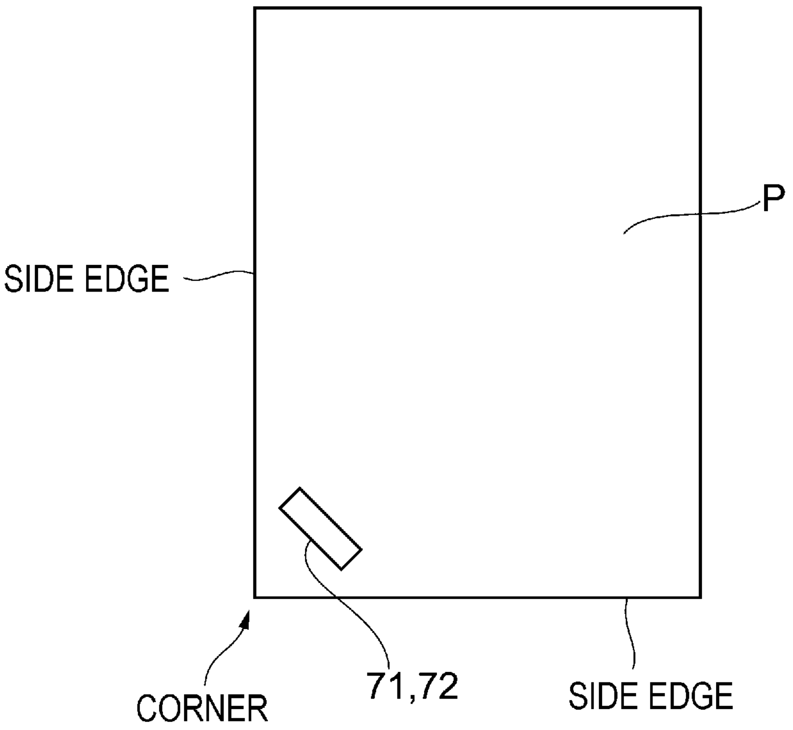
FIGS. 6A and 6B illustrate binding methods.

Specifically, the CPU 211 makes the setting to reduce the amount of water if the binding method is oblique binding as illustrated in FIG. 6A (illustrating a binding method). In the oblique binding, rectangular sheets of paper P are bound by the first binding teeth 71 and the second binding teeth 72 positioned to intersect the side edges of the sheets of paper P.

Figure 6B:
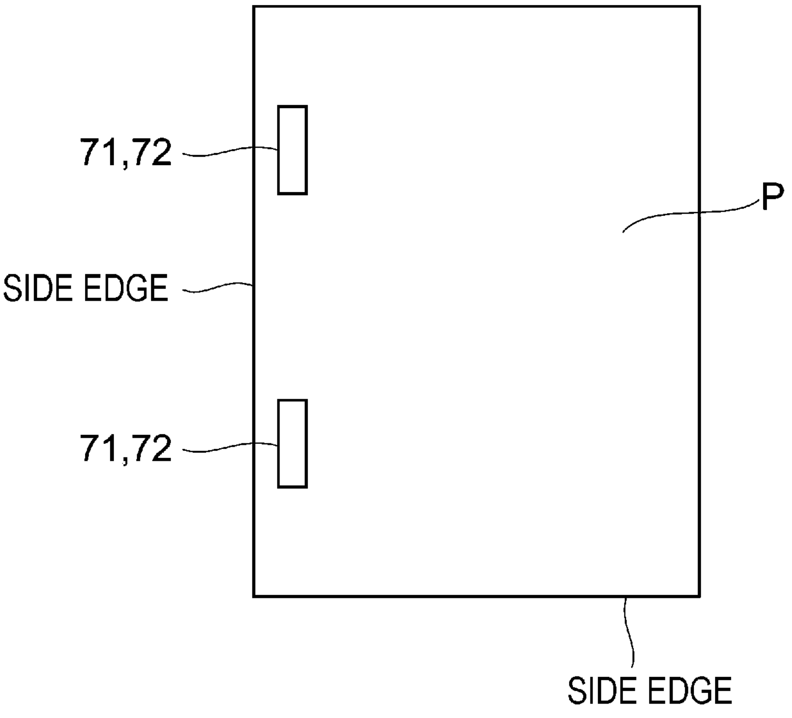

If the binding method is the oblique binding, the CPU 211 sets the water reduction amount to become larger than in a case where the binding method is parallel binding (see FIG. 6B). In the parallel binding, the sheets of paper P are bound by the first binding teeth 71 and the second binding teeth 72 positioned along the side edges of the sheets of paper P.

In this exemplary embodiment, in the case of binding at the point (C) or (D) in FIG. 3, the CPU 211 sets the water reduction amount to become larger than in the case of binding at the points (A) and (B).

The binding strength tends to be secured more in the oblique binding than in the parallel binding.

In general, fibers of paper P run along the side edge of the paper P. The fibers are more likely to interwind each other in the oblique binding than in the parallel binding, thereby securing more binding strength.

In the oblique binding, the binding strength is likely to be maintained even if the water reduction amount is increased. In this exemplary embodiment, the water reduction amount is set larger in the oblique binding than in the parallel binding as described above.

In the parallel binding, the binding strength is likely to become lower than in the oblique binding. Therefore, the water reduction amount is set smaller in the parallel binding than in the oblique binding.

In this exemplary embodiment, the CPU 211 outputs information indicating an expected decrease in the binding performance for the sheets of paper P if the setting is made to reduce the amount of water.

If the setting is made to reduce the amount of water, the binding force may decrease due to a decrease in the adhesion force of the fibers of the sheets of paper P, or a longer binding period may be necessary to secure the binding strength.

In view of those cases, the information indicating the expected decrease in the binding performance for the sheets of paper P is output if the setting is made to reduce the amount of water.

Specifically, the CPU 211 outputs information indicating an expected decrease in the binding force or an expected increase in the binding period if the setting is made to reduce the amount of water.

For example, the information display 915 (see FIG. 1) displays the information indicating the expected decrease in the binding force or the expected increase in the binding period to notify the user.

Although description is omitted in the above, the binding period may be increased if the setting is made to reduce the amount of water.

In other words, if the setting is made to reduce the amount of water, the binding period may be set longer than in the case where the setting is not made to reduce the amount of water.

More specifically, if the setting is made to reduce the amount of water, the first binding teeth 71 and the second binding teeth 72 may press the binding portion of the sheets of paper P for a longer period.

In this case, the user may be notified about an expected increase in the binding period due to the setting to reduce the amount of water as in this exemplary embodiment in which the information indicating an expected increase in the binding period is output.

In this exemplary embodiment, the CPU 211 outputs information on the remaining amount of water to be supplied by the water supplier 710.

As described later, the information display 915 displays the information on the remaining amount of water.

Figure 7:
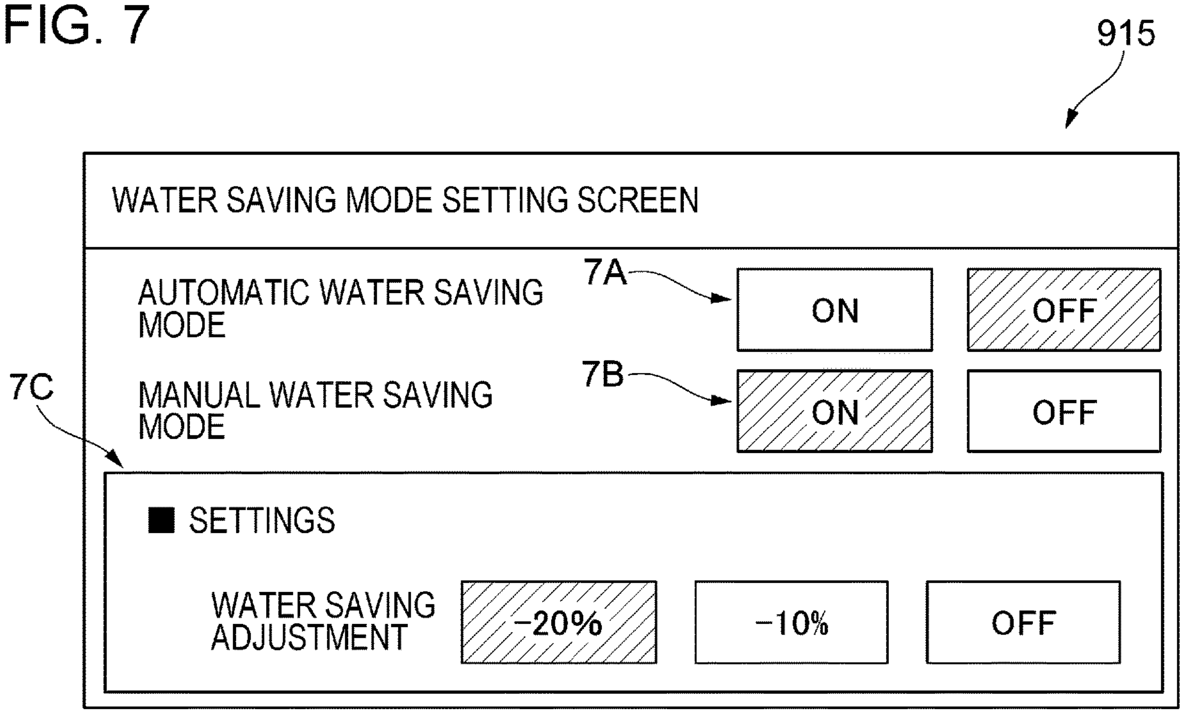
FIG. 7 illustrates a display example of an information display.

FIG. 7 illustrates a display example of the information display 915.

In this exemplary embodiment, the user may select an automatic water saving mode or a manual water saving mode.

If the user wants to set the automatic water saving mode, the user selects an option indicated by a symbol 7A. In response to the user's selection, the automatic water saving mode is set and the CPU 211 performs water saving control in the automatic water saving mode.

If the user wants to set the manual water saving mode, the user selects an option indicated by a symbol 7B in FIG. 7. Thus, the manual water saving mode is set and the CPU 211 performs water saving control in the manual water saving mode.

In this exemplary embodiment, either the automatic water saving mode or the manual water saving mode may be selected.

In this exemplary embodiment, the manual water saving mode is canceled if the water saving mode is set to the automatic water saving mode, and the automatic water saving mode is canceled if the water saving mode is set to the manual water saving mode.

In the manual water saving mode, the CPU 211 performs the water saving control based on information input by the user.

In the manual water saving mode, information for prompting the user to input a water saving level is displayed as indicated by a symbol 7C. In this example, the displayed information prompts the user to set the water saving level to −20%, −10%, or OFF.

In the manual water saving mode, the user may set the water saving amount.

In response to the user's setting on the water saving amount, the CPU 211 subtracts the set water saving amount from a water supply amount originally set based on the sheets of paper P to be bound (hereinafter referred to as "original supply amount"), and sets the resultant water amount as a new water amount.

In this exemplary embodiment, water is supplied to the sheets of paper P to be bound in an amount that is based on the number of the sheets of paper P as described above. If the water saving is not performed, the amount that is based on the number of the sheets of paper P is the original supply amount, and water is supplied to the sheets of paper P in the original supply amount.

If the user sets the water saving amount, the CPU 211 subtracts the set water saving amount from the original supply amount, and sets the resultant water amount as a new water amount.

Figure 8:
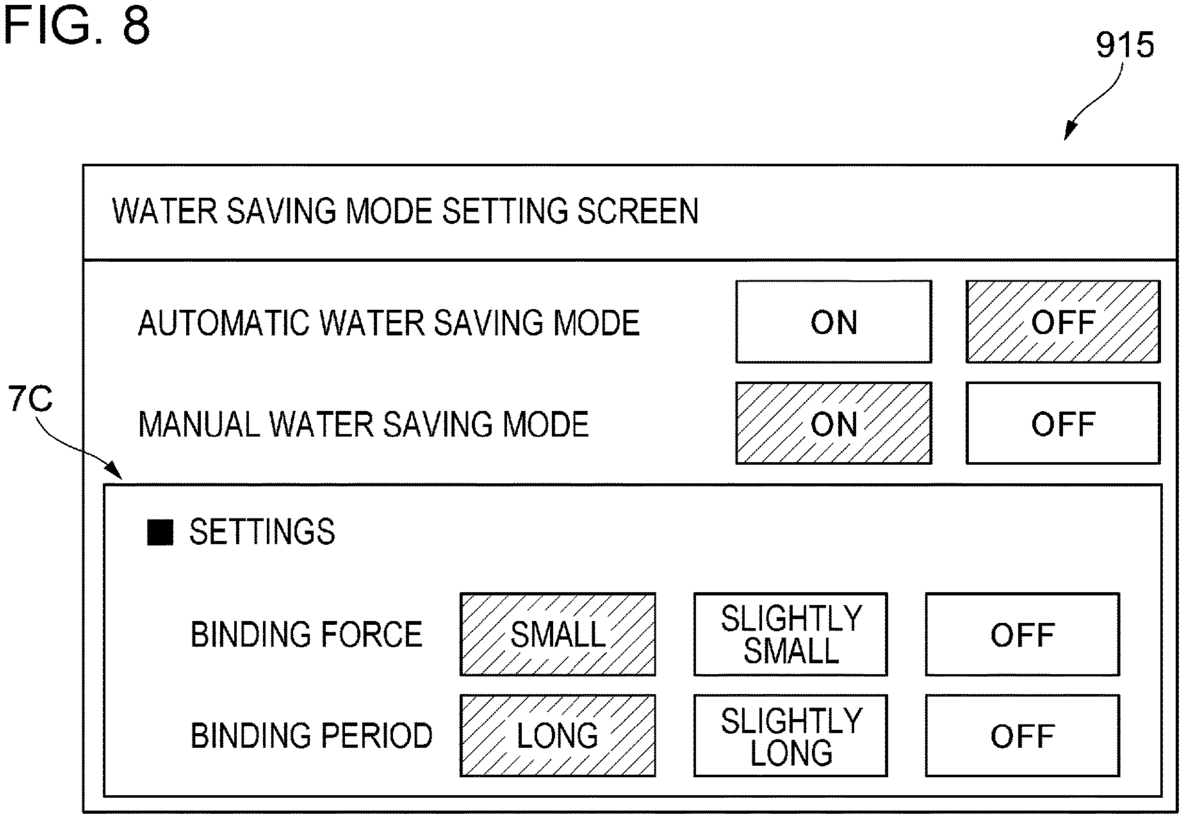
FIG. 8 illustrates another display example of the information display.

FIG. 8 illustrates another display example of the information display 915.

In this display example, setting options for the binding force and setting options for the binding period are displayed as options in the case where the manual water saving mode is selected by the user.

In this exemplary embodiment, the CPU 211 makes a setting on the water saving if the user makes a setting to reduce the binding force as described above. In this case, the CPU 211 sets the water saving level to increase as the binding force reduction level increases.

The CPU 211 performs −10% water saving in response to a user's setting of a first level "slightly small" for the binding force. The CPU 211 performs −20% water saving in response to a setting of a second level "small" for the binding force.

In this exemplary embodiment, the CPU 211 also makes a setting on the water saving if the user makes a setting to increase the binding period. In this case, the CPU 211 sets the water saving level to increase as the binding period increases.

In this exemplary embodiment, the CPU 211 performs −10% water saving in response to a user's setting of a first level "slightly long" for the binding period. The CPU 211 performs −20% water saving in response to a user's setting of a second level "long" for the binding period.

FIGS. 9A and 9B illustrate specific examples of the water saving in the manual water saving mode.

In this exemplary embodiment, the water supplier 710 supplies water to the sheets of paper P to be bound in the original supply amount that is based on the sheets of paper P as described above.

As illustrated in FIG. 9A, the original supply amount increases as the estimated bound paper count increases. In this exemplary embodiment, the water supply amount per paper P does not change but the water supply amount in units of paper bundle increases as the estimated bound paper count increases.

In this exemplary embodiment, the original supply amount is set based on the sheets of paper P in this manner.

FIG. 9B illustrates a specific example of the water saving amount in a case where the user manually sets the water saving amount by operating the information display 915.

In a case where the user does not set the water saving amount, the water saving is not performed in this exemplary embodiment. As indicated by a symbol 9A, the amount of water to be supplied to the sheets of paper P is the original supply amount.

If the user selects −10% as the water saving amount, a water amount obtained by subtracting a −10% water amount from the original supply amount is set as a new water amount as indicated by a symbol 9B.

If the user selects −20% as the water saving amount, a water amount obtained by subtracting a −20% water amount from the original supply amount is set as a new water amount as indicated by a symbol 9C.

FIG. 10 illustrates another specific example of the water saving.

FIG. 10 illustrates a specific example in a case where the user makes a setting to reduce the binding force and/or increase the binding period.

In this exemplary embodiment, in response to the user's setting to reduce the binding force, a water amount that is based on the setting is subtracted from the original supply amount, and the resultant water amount is set as a new water amount.

In this processing example, in response to a user's setting to reduce the binding force at a first level, a −10% water amount is subtracted from the original supply amount as indicated by a symbol 10A, and the resultant water amount is set as a new water amount.

In response to a user's setting to reduce the binding force at a second level, a −20% water amount is subtracted from the original supply amount as indicated by a symbol 10B, and the resultant water amount is set as a new water amount.

In this exemplary embodiment, in response to the user's setting to increase the binding period, a water amount is subtracted from the original supply amount, and the resultant water amount is set as a new water amount.

Specifically, in response to a user's setting to increase the binding period at a first level, a −10% water amount is subtracted from the original supply amount as indicated by a symbol 10C, and the resultant water amount is set as a new water amount.

In response to a user's setting to increase the binding period at a second level, a −20% water amount is subtracted from the original supply amount as indicated by a symbol 10D, and the resultant water amount is set as a new water amount.

FIG. 11 illustrates another specific example of the water saving in the automatic water saving mode.

In the specific example of FIG. 11, the CPU 211 determines the water saving amount based on environment information, paper type information, or a binding method.

If the humidity that is an example of the environment information is higher by a first level than a predetermined threshold as indicated by a symbol 11A, the CPU 211 subtracts a −10% water amount from the original supply amount, and sets the resultant water amount as a new water amount.

If the humidity is higher by a second level than the predetermined threshold as indicated by a symbol 11B, the CPU 211 subtracts a −20% water amount from the original supply amount, and sets the resultant water amount as a new water amount.

If the type of the sheets of paper P indicated by the paper type information is plain paper as indicated by a symbol 11C, the CPU 211 subtracts a −10% water amount from the original supply amount, and sets the resultant water amount as a new water amount.

If the type of the sheets of paper P indicated by the paper type information is recycled paper as indicated by a symbol 11D, the CPU 211 subtracts a −20% water amount from the original supply amount, and sets the resultant water amount as a new water amount.

If the type of the sheets of paper P indicated by the paper type information is unknown or a setting is made not to perform the water saving based on the paper type information as indicated by a symbol 11E, the CPU 211 does not make the setting to reduce the water amount.

If the binding method is parallel binding as indicated by a symbol 11F, the CPU 211 does not make the setting to reduce the water amount.

If the binding method is oblique binding as indicated by a symbol 11G, the CPU 211 subtracts a −10% water amount from the original supply amount, and sets the resultant water amount as a new water amount.

Figure 12:
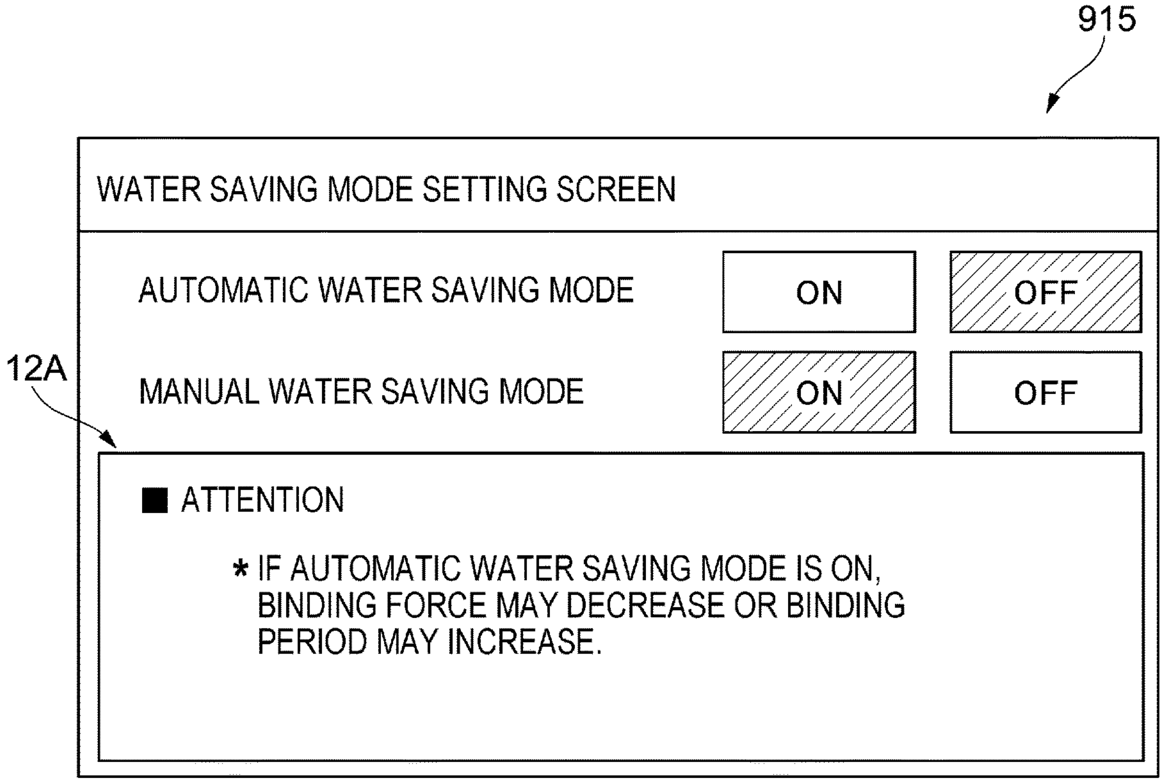
FIG. 12 illustrates a specific display example of the information display.

FIG. 12 illustrates another specific display example of the information display 915.

In this exemplary embodiment, the CPU 211 outputs information indicating an expected decrease in the binding performance for the sheets of paper P if the setting is made to reduce the amount of water as described above.

In this exemplary embodiment, the information display 915 displays the information as illustrated in FIG. 12.

As indicated by a symbol 12A in FIG. 12, information indicating a possible decrease in the binding force and information indicating a possible increase in the binding period are displayed as the information indicating the expected decrease in the binding performance.

In other words, information indicating that the binding may be collapsed and information indicating that the binding period may be extended are displayed in the display example of FIG. 12.

More specifically, the information displayed in the display example of FIG. 12 indicates trouble that may occur if the user selects the automatic water saving mode.

In the display example of FIG. 12, the information indicating the possible decrease in the binding force and the information indicating the possible increase in the binding period are displayed as the information on the trouble that may occur if the user selects the automatic water saving mode.

Figure 13:
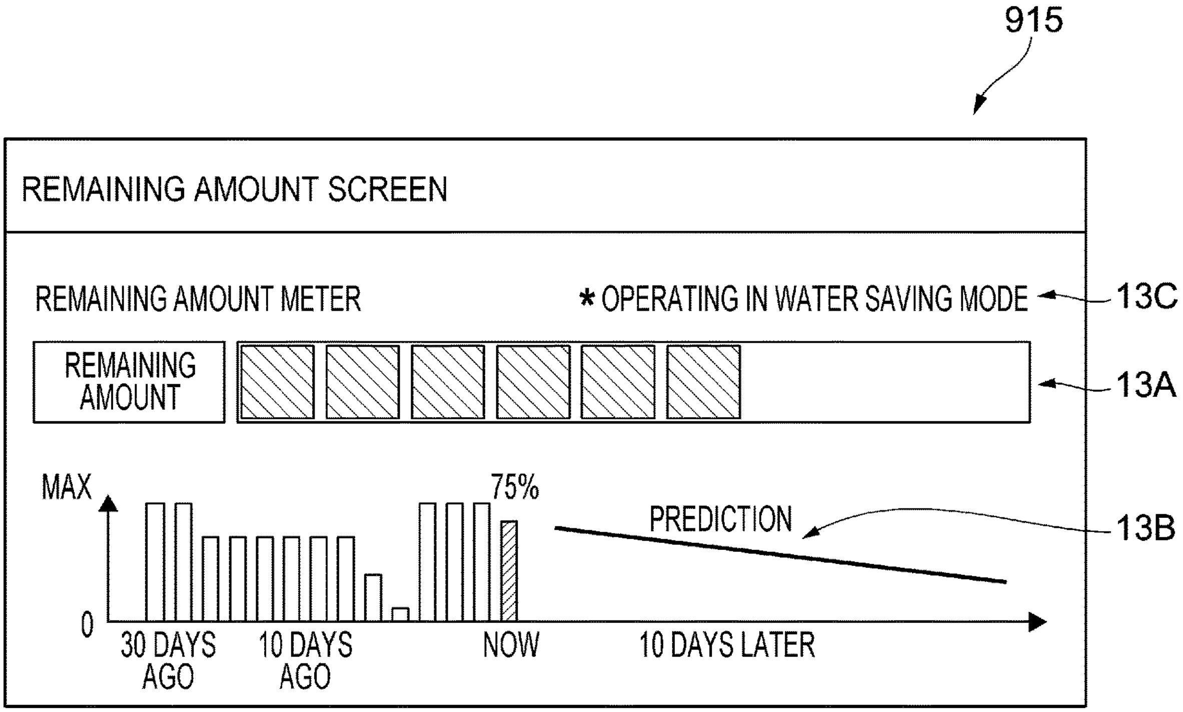
FIG. 13 illustrates another display example of the information display.

FIG. 13 illustrates another display example of the information display 915.

In this exemplary embodiment, the CPU 211 outputs information on the remaining amount of water to be supplied by the water supplier 710 as described above.

In this exemplary embodiment, the information display 915 displays the information on the remaining amount of water as indicated by a symbol 13A in FIG. 13. In this exemplary embodiment, the container storing water is provided, and information on the remaining amount of water in the container is displayed in FIG. 13.

In this exemplary embodiment, the information on the remaining amount of water in the container is acquired based on information from a sensor that detects the remaining amount, and the information display 915 displays the acquired information.

In this exemplary embodiment, predicted values of the remaining amount of water in the future are also displayed as indicated by a symbol 13B.

In this exemplary embodiment, future water consumption is predicted based on a tendency of water consumption thus far, and predicted values of the remaining amount of water are acquired based on the prediction result.

In this display example, information indicating that the current water supply mode is the water saving mode is displayed as indicated by a symbol 13C.

Figure 14:
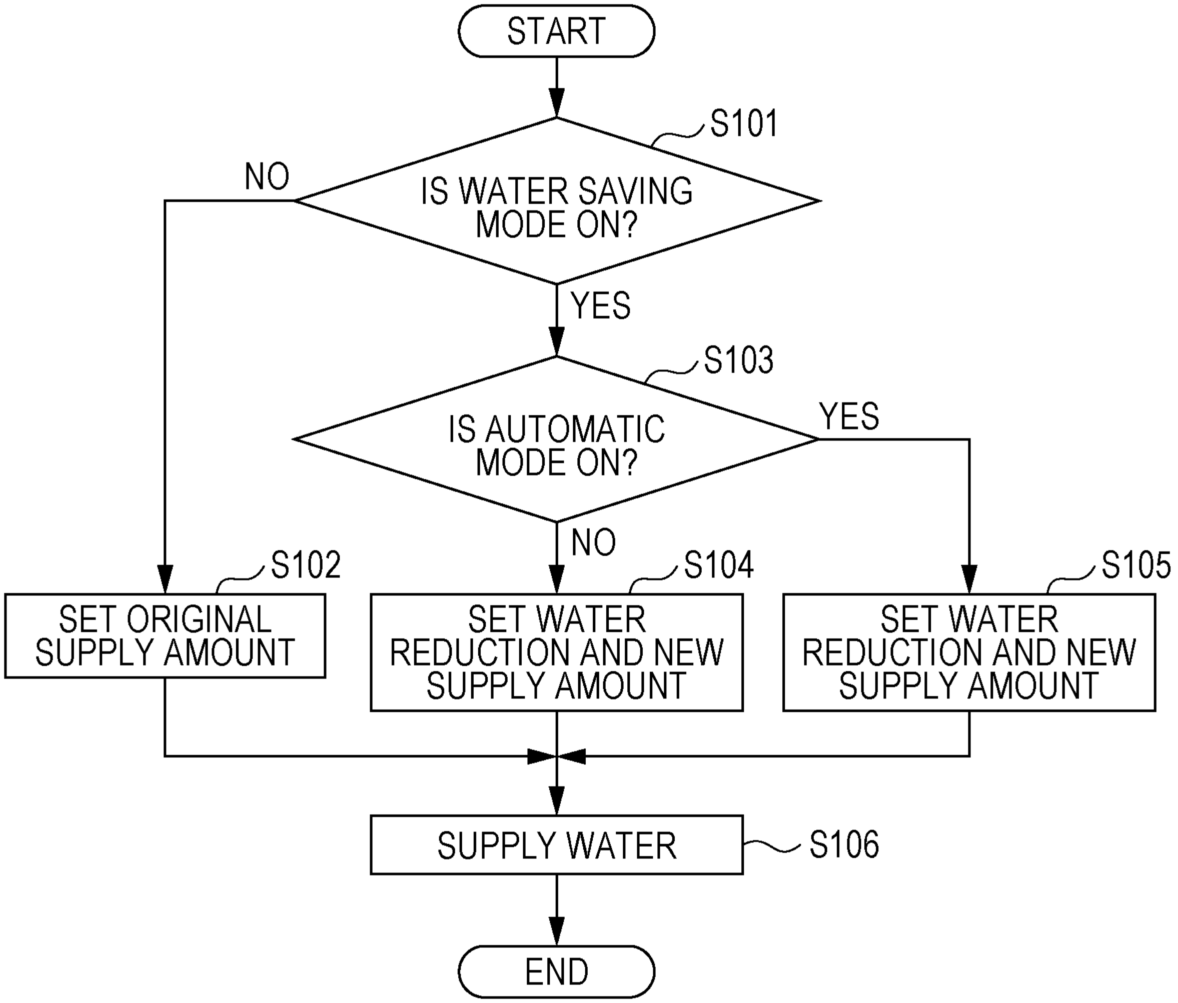
FIG. 14 is a flowchart illustrating a series of processes to be executed by a CPU.

FIG. 14 is a flowchart illustrating a series of processes to be executed by the CPU 211.

In this exemplary embodiment, the CPU 211 first determines whether the water saving mode is ON (Step S101).

If the CPU 211 determines, in Step S101, that the water saving mode is not ON, the CPU 211 keeps the water supply amount as the original supply amount obtained based on the sheets of paper P without making the setting to reduce the amount of water (Step S102).

If the CPU 211 determines, in Step S101, that the water saving mode is ON, the CPU 211 determines whether the automatic water saving mode is ON (Step S103).

If the CPU 211 determines that the automatic water saving mode is not ON, that is, the manual water saving mode is ON, the CPU 211 makes the setting to reduce the water supply amount and sets a new water supply amount (Step S104).

In this case, the CPU 211 sets the new supply amount based on a user's setting.

If the CPU 211 determines, in Step S103, that the automatic water saving mode is ON, the CPU 211 makes the setting to reduce the water supply amount and sets a new water supply amount (Step S105).

In this case, the CPU 211 sets the new supply amount based on environment information, paper type information, or a binding method as described above.

After the process of Step S102, Step S104, or Step S105, the CPU 211 activates the water adjusting mechanism 700 (see FIG. 3) to supply water to the sheets of paper P (Step S106). Then, the CPU 211 activates the binding unit 52 (see FIG. 3) to bind the sheets of paper P.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A binding apparatus comprising:
- a binder configured to bind sheets of paper by advancing binding teeth toward the sheets of paper;
- a water supplier configured to supply a preset amount of water to the sheets of paper to be bound by the binder; and
- a processor configured to, if a specific condition is satisfied, make a setting to reduce the amount of water to be supplied to the sheets of paper by the water supplier,
- wherein the water supplier is configured to supply water to the sheets of paper to be bound by the binder in an amount that is based on the sheets of paper, and wherein the processor is configured to, if the specific condition is satisfied, make a setting to supply water to the sheets of paper in an amount smaller than the amount that is based on the sheets of paper.

2. The binding apparatus according to claim 1, wherein the processor is configured to:
- make the setting to reduce the amount of water in response to an instruction from a user.

3. An image forming system comprising:
- an image forming apparatus configured to form an image on paper; and
- a binding apparatus configured to bind sheets of paper having images formed by the image forming apparatus,
- wherein the binding apparatus is the binding apparatus according to claim 2.

4. The binding apparatus according to claim 1, wherein the processor is configured to:
- make the setting to reduce the amount of water in response to a predetermined specific setting made for the binder.

5. The binding apparatus according to claim 4, wherein the processor is configured to:
- make the setting to reduce the amount of water in response to a setting to reduce a binding force of the binder.

6. The binding apparatus according to claim 4, wherein the processor is configured to:
- make the setting to reduce the amount of water in response to a setting to increase a binding period of the binder.

7. The binding apparatus according to claim 1, wherein the processor is configured to:
- set a water reduction amount if the setting is made to reduce the amount of water.

8. The binding apparatus according to claim 7, wherein the processor is configured to:
- set the water reduction amount based on a setting made for the binder.

9. The binding apparatus according to claim 8, wherein the processor is configured to:
- if the setting made for the binder is a setting to increase an advancing amount of the binding teeth over a predetermined threshold, set the water reduction amount to become larger than in a setting to reduce the advancing amount under the threshold.

10. The binding apparatus according to claim 7, wherein the processor is configured to:
- set the water reduction amount based on information on water contained in the sheets of paper to be bound by the binder.

11. The binding apparatus according to claim 7, wherein the processor is configured to:
- set the water reduction amount based on environment information about an environment inside the binding apparatus and/or an environment outside the binding apparatus.

12. The binding apparatus according to claim 7, wherein the processor is configured to:
- set the water reduction amount based on information on a type of the sheets of paper to be bound by the binder.

13. The binding apparatus according to claim 7, wherein the processor is configured to:
- set the water reduction amount based on a binding method of the binder.

14. The binding apparatus according to claim 1, wherein the processor is configured to:
- output information indicating an expected decrease in binding performance for the sheets of paper if the setting is made to reduce the amount of water.

15. The binding apparatus according to claim 1, wherein the processor is configured to:
- output information on a remaining amount of water to be supplied by the water supplier.

16. An image forming system comprising:
- an image forming apparatus configured to form an image on paper; and
- a binding apparatus configured to bind sheets of paper having images formed by the image forming apparatus,
- wherein the binding apparatus is the binding apparatus according to claim 1.

17. An image forming system comprising:
- an image forming apparatus configured to form an image on paper; and
- a binding apparatus configured to bind sheets of paper having images formed by the image forming apparatus,
- wherein the binding apparatus is the binding apparatus according to claim 1.

18. A non-transitory computer readable medium storing a program causing a computer to execute a process, the computer being configured to control a binding apparatus comprising a binder configured to bind sheets of paper by advancing binding teeth toward the sheets of paper, and a water supplier configured to supply a preset amount of water to the sheets of paper to be bound by the binder, the process comprising:

making, if a specific condition is satisfied, a setting to reduce the amount of water to be supplied to the sheets of paper by the water supplier, wherein the water supplier is configured to supply water to the sheets of paper to be bound by the binder in an amount that is based on the sheets of paper, and wherein the computer is configured to, if the specific condition is satisfied, make a setting to supply water to the sheets of paper in an amount smaller than the amount that is based on the sheets of paper.

19. A method for controlling a binding apparatus comprising a binder configured to bind sheets of paper by advancing binding teeth toward the sheets of paper, and a water supplier configured to supply a preset amount of water to the sheets of paper to be bound by the binder, the method comprising:

making, if a specific condition is satisfied, a setting to reduce the amount of water to be supplied to the sheets of paper by the water supplier, supplying, by the water supplier, water to the sheets of paper to be bound by the binder in an amount that is based on the sheets of paper, and wherein, if the specific condition is satisfied, make a setting to supply water to the sheets of paper in an amount smaller than the amount that is based on the sheets of paper.

* * * * *